United States Patent [19]

Jellema

[11] 4,293,272
[45] Oct. 6, 1981

[54] METHOD AND APPARATUS FOR DENESTING A PLURALITY OF CONTAINERS FILLED WITH ARTICLES

[75] Inventor: Auke Jellema, Aalten, Netherlands

[73] Assignee: Staalkat B.V., Aalten, Netherlands

[21] Appl. No.: 963,565

[22] Filed: Nov. 20, 1978

[51] Int. Cl.³ .............................................. B65G 59/04
[52] U.S. Cl. .................. 414/744 B; 414/121; 414/416
[58] Field of Search ............... 414/744 R, 744 B, 112, 414/117, 120–122, 413, 416; 198/409, 488, 642

[56] References Cited

U.S. PATENT DOCUMENTS

| | | | |
|---|---|---|---|
| 3,031,906 | 5/1962 | Holman | 414/121 X |
| 3,506,140 | 4/1970 | Koch et al. | 414/416 X |
| 3,929,234 | 12/1975 | Warren | 414/416 X |
| 4,079,845 | 3/1978 | Warren | 414/121 |

FOREIGN PATENT DOCUMENTS

| | | | |
|---|---|---|---|
| 238494 | 4/1960 | Australia | 414/744 B |
| 747138 | 3/1956 | United Kingdom | 414/416 |

*Primary Examiner*—Trygve M. Blix
*Assistant Examiner*—Terrance L. Siemens
*Attorney, Agent, or Firm*—Cushman, Darby & Cushman

[57] ABSTRACT

Stacks of nested containers containing articles and traveling on a conveyor belt are removed from the belt by means of at least two denesters which deposit the articles on one discharge belt and the containers on another discharge belt. One denester operates on the upper half of each stack of filled containers and the other denester operates on the lower half of the stack.

3 Claims, 10 Drawing Figures

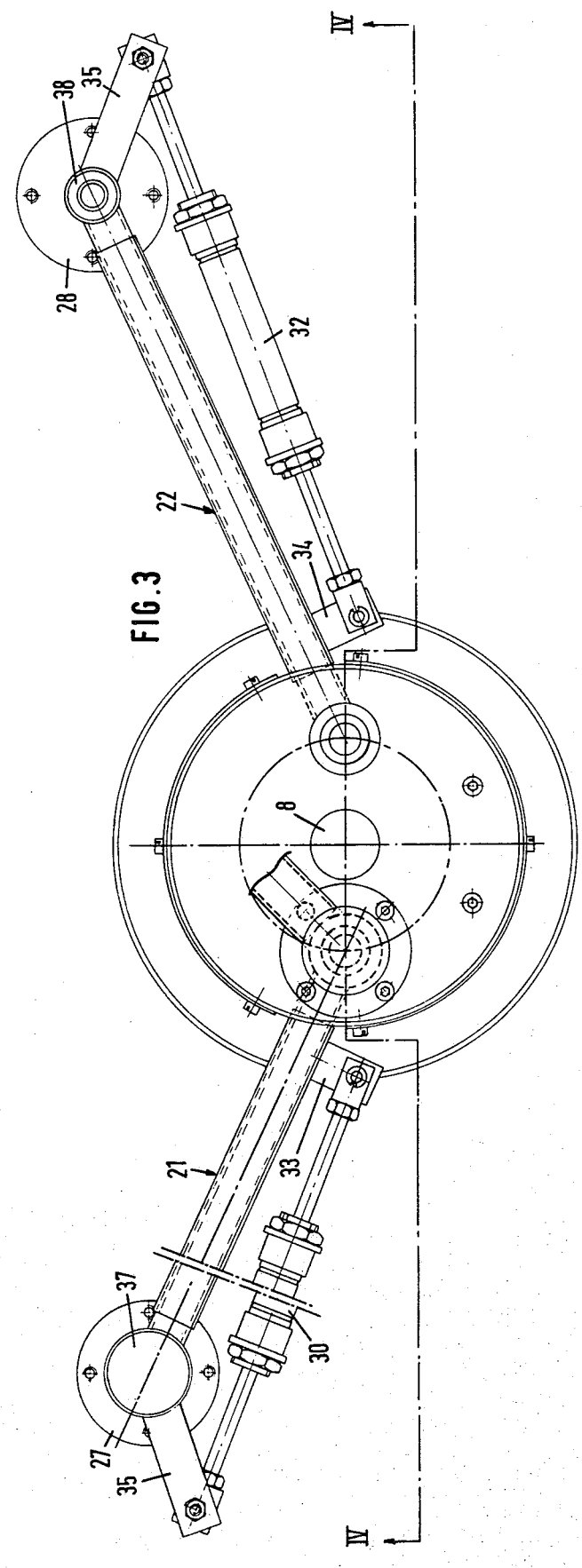

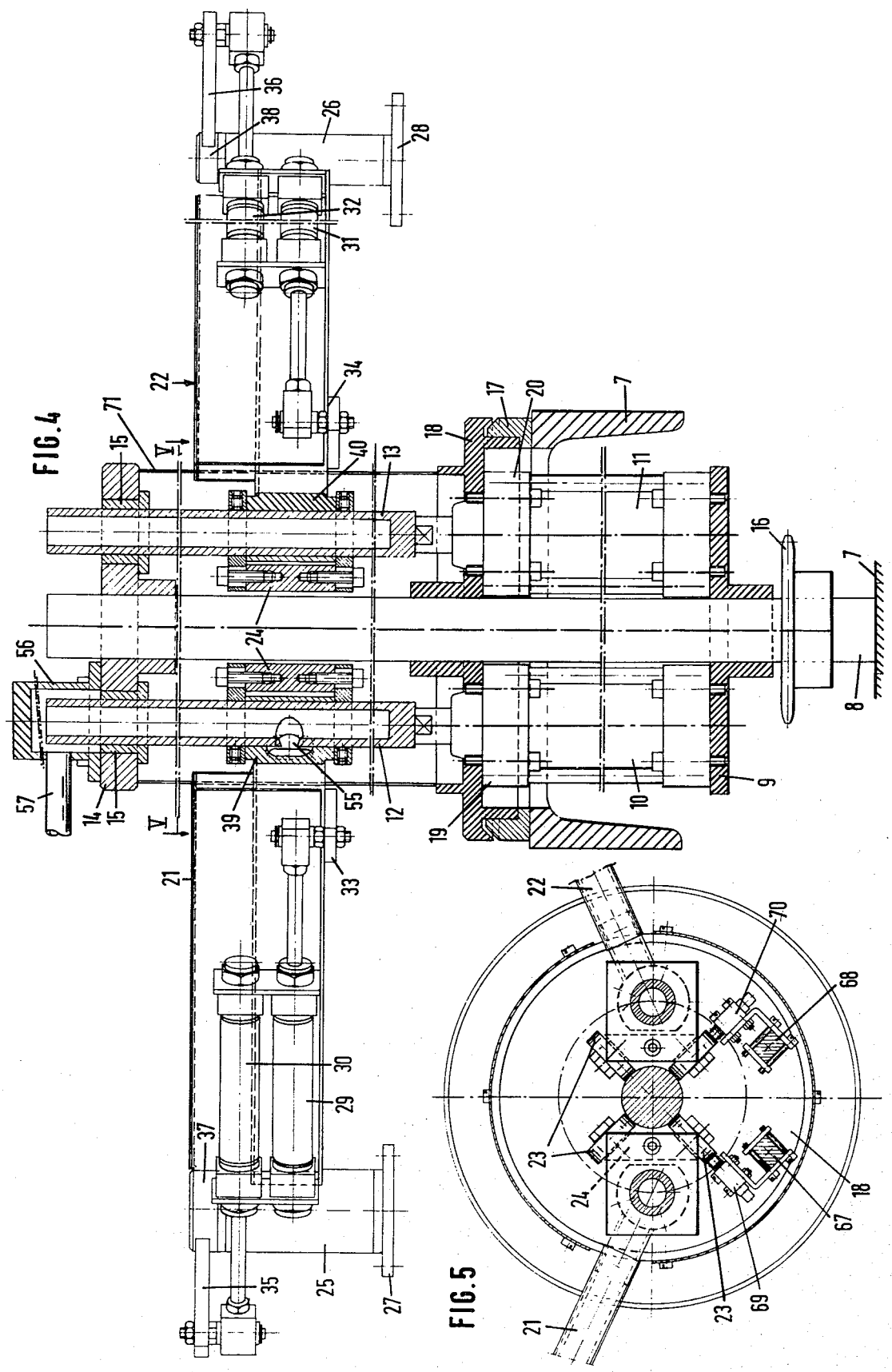

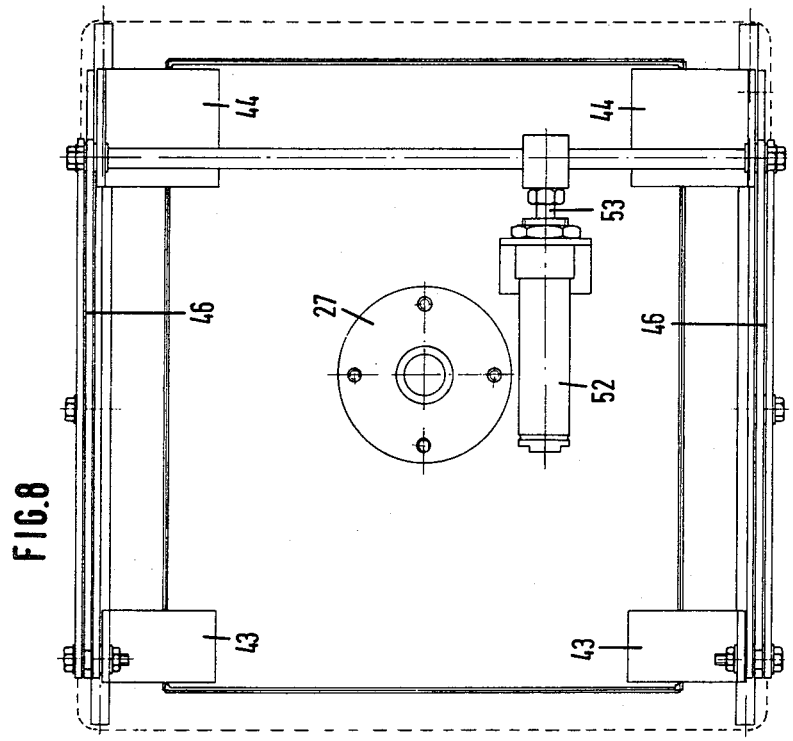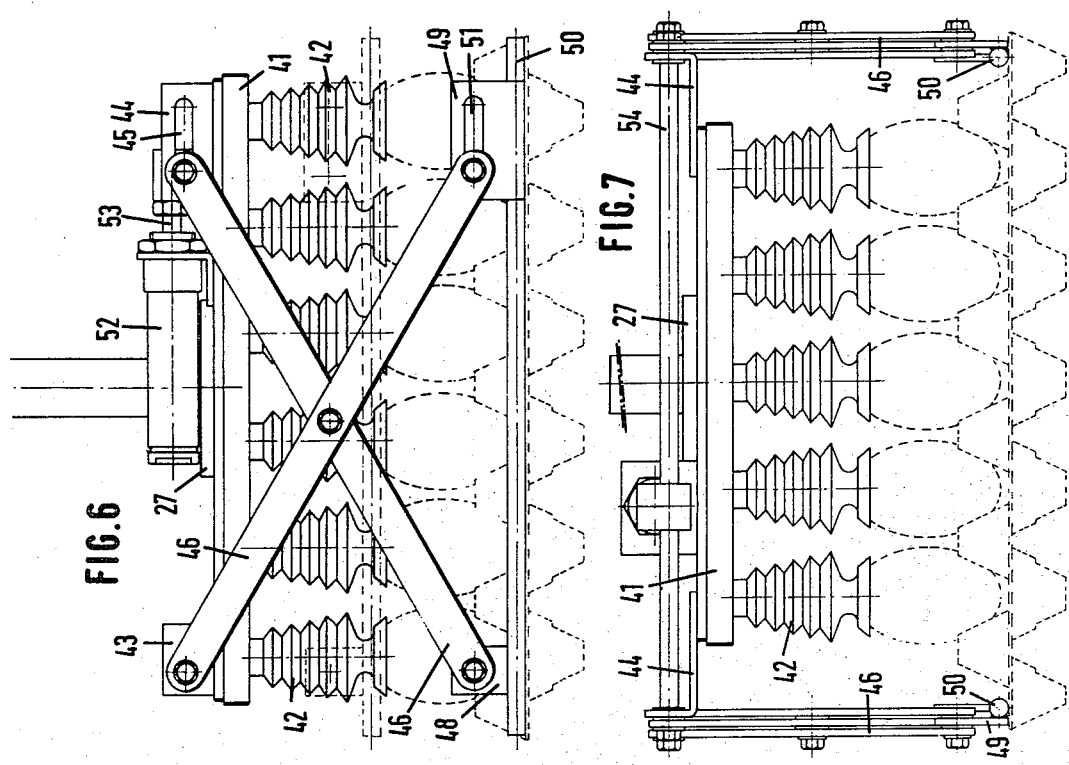

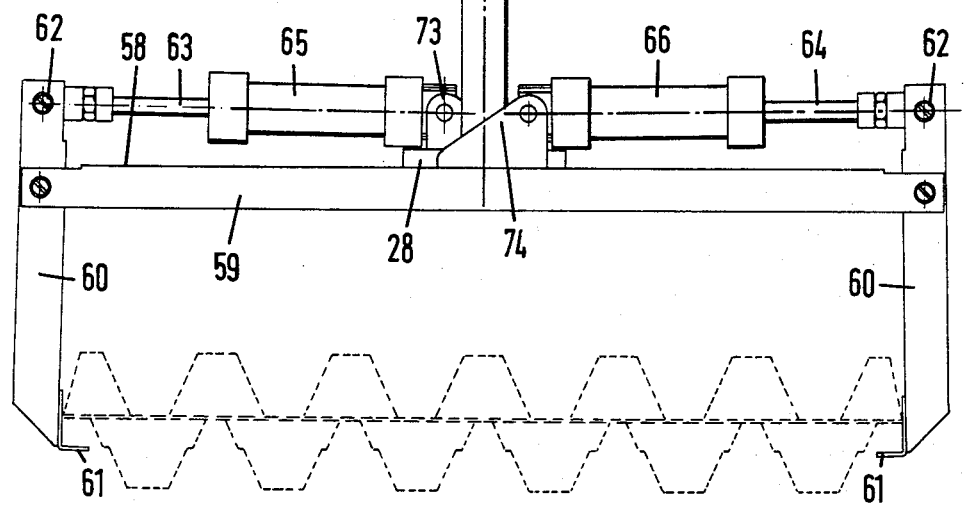
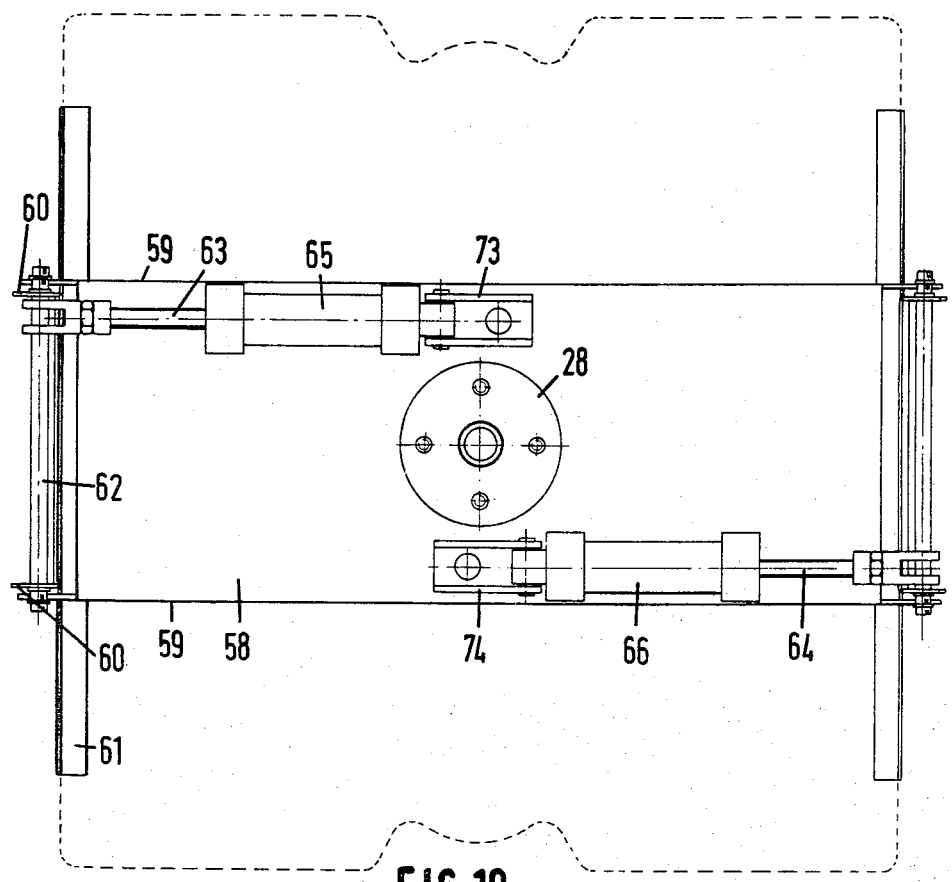

METHOD AND APPARATUS FOR DENESTING A PLURALITY OF CONTAINERS FILLED WITH ARTICLES

This invention relates to apparatus for denesting a plurality of stacked containers filled with articles, such as eggs, and traveling on a conveyor belt, by means of at least one denester fitted with means for removing the articles and means for removing the containers.

It is the object to improve this kind of apparatus which is disclosed for unloading and separating crates filled with bottles in German Offenlegungsschrift No. 2,211,850, and to make it suitable for separating at high speed large numbers of stacks of trays filled with eggs, tomatoes and/or the like, supplied via said conveyor belt.

The apparatus includes a plurality of denesters disposed along the conveyor belt, by means of which a corresponding portion of each stack is discharged each time a denester operates.

Each denester includes at least one arm movable up and down relative to a stationary frame and reciprocatingly swingable relative to the arm and fitted with means for catching the articles and at least a second similar arm for catching the containers, said arms being so tuned to each other or coupled with each other that during the discharge of articles the second arm is moved towards the stack and vice versa. There are at least two denesters, the first denester discharging the upper half of the supplied stacks and the second denester discharging the lower half of the supplied stacks. Since the first denester each time discharges the upper half and the second denester each time the lower half, the feed belt need be shifted each time only over one stack distance, so that the acceleration of the belt can be limited and the chance of overturning the supplied stacks of filled trays is substantially reduced.

It will be clear that instead of two also a plurality of denesters may be employed; the number of filled trays could be handled by each denester corresponding to the number of denesters.

One embodiment of the denester according to the invention will now be explained, by way of example, with reference to the accompanying drawings, wherein:

FIG. 3 is a top view of the denester according to FIG. 1, on an enlarged scale;

FIG. 4 is a cross-section on the line IV—IV in FIG. 3;

FIG. 5 is a cross-section on the line V—V in FIG. 4;

FIG. 6 is a front view of the suction box applied in the apparatus shown in FIGS. 1-5;

FIG. 7 is a side view of the apparatus shown in FIG. 6;

FIG. 8 is a top view of the apparatus shown in FIG. 6;

FIG. 9 is a front view of the means for catching a tray, applied in the apparatus according to FIGS. 1-5 and FIG. 10 is a top view of the apparatus shown in FIG. 9.

Figure 1:
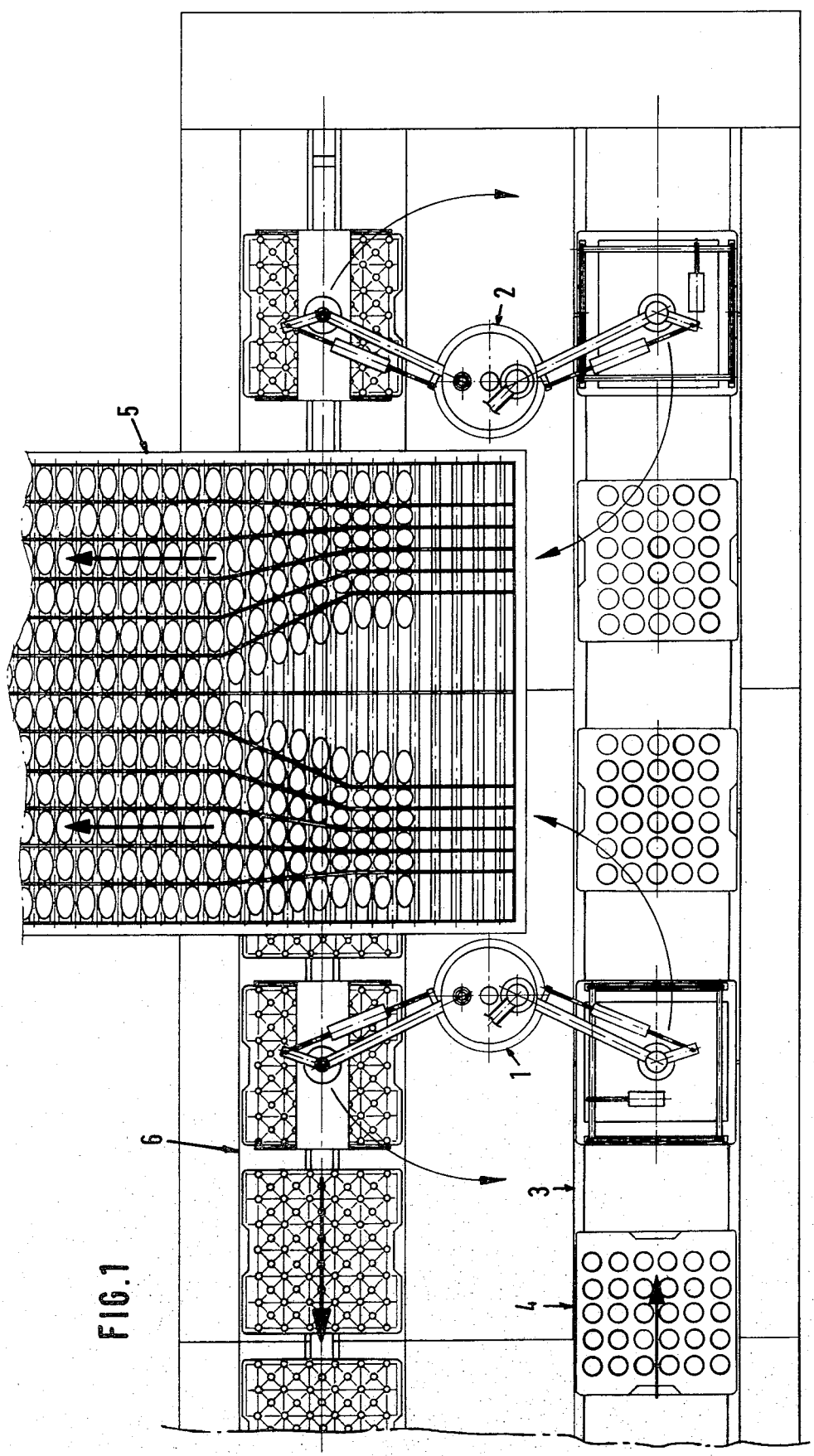
FIG. 1 shows a top view of a denester together with feed and discharge belts.

According to the drawings an apparatus for denesting trays filled with eggs or the like (FIGS. 1 and 2) is provided with two denesters 1 and 2 which are arranged between a feed belt 3 for stacks 4 of trays filled with eggs or the like and a discharge belt 5 for eggs and discharge belt 6 for empty trays. The feed belt 3 and the discharge belt 6 may be moved intermittently, while the discharge belt 5 can be moved continuously by means of driving mechanisms, not shown.

As appears in particular in FIGS. 3, 4 and 5, each denester comprises a shaft 8 rotatably mounted in a frame 7. Symmetrically to the shaft 8 two cylinders 10, 11 are arranged on a carrier 9 fixedly connected to the shaft, the extended piston rods 12, 13 of said cylinders being guided by a sheave 14 likewise fixedly connected to the shaft: two guide bushings 15 are mounted in the sheave.

For the purpose of rotating the shaft 8 there is mounted thereon a chain wheel 16 which is driven by a chain, not shown. For guiding, during said rotation, the two cylinders relative to the stationary upper frame portion 7, there is mounted a bearing 17 fixedly on said frame portion. A flange 18 is adapted to rotate in said bearing wherein the heads 19, 20 of cylinders 10, 11 are mounted.

On the extended piston rods 12, 13 there are affixed hollow arms 21, 22, which each through two rollers 23 are supported on and are movable along the shaft 8. To this effect the bosses 39, 40 of said arms 21, 22 are provided with a flattened side which is adapted to coact with a block 24 connected therewith by means of screws and clamping plates, on which block rollers 23 are disposed at a specific angle relative to each other. As a result the arms 21 and 22 relatively positioned at a specific angle, upon rotation of the shaft 8, can be moved with maintenance of said angle.

The free end of each arm 21, 22 is provided with a bearing bush 25, 26 wherein a boss is adapted to rotate, the bottom end of which is provided with an attachment flange 27, 28 for attaching therein a suction box 41 or a means 58,60,61 for catching a tray.

Since, as clearly appears from FIG. 1, the arms 21, 22 are relatively positioned at an angle differing from 90°, and moreover (see FIG. 2) the trays in each applied stack are rotated relatively to each other alternately through 90°, the bosses with the flanges 27, 28 should be rotated each time relatively to the arms 21, 22 in order to properly dispense the articles, in order to place the eggs or the trays in the porper position on the discharge belts 5 or 6. To this effect there are mounted on each arm 21, 22 two coupled piston-cylinder assemblies 29, 30 and 31, 32, the piston rod of cylinders 29, 31 being rotatably connected to a reinforcement plate 33, 34 of the arm 21, 22. The free end of piston rods of the two other cylinders 30, 32 is rotatably coupled to an arm 35, 36 of a flange 37, 38 of said bosses rotatable in the bearing bushes 25, 26.

As shown in FIGS. 6, 7 and 8 a suction box 41 affixed to the flange 27, is provided with a plurality of suction cups 42. Upon the suction box there are mounted two angle irons 43 and two angle irons 44, the last of which being provided with slots 45. Said angle irons serve each time for attachment of the ends of a linkage 46, the free ends of which are rotatably connected to attachment lips 48, 49 mounted on holddown rods 50. In order to enable a link motion, also slots 51 are disposed in the attachment lips 49.

The motion of the links is effected by means of a piston-cylinder assembly 52 mounted on the suction box, the piston rod 53 of which is connected to a crossbar 54, each end of which is coupled to a link end.

The operation of the suction box is effected through the hollow boss contiguous to the flange 27, which boss is mounted in the bearing bush 25 and is contiguous in situ to the hollow arm 21. The latter is in communication via an opening 55 (see FIG. 4) with the hollow, extended piston rod 12. The free end of the piston rod 12, extending through the guide sleeve 15, opens into a space defined by a cover 56, which space is connected to a line 57 connected to a vacuum source.

FIGS. 9 and 10 finally show the catching means for a tray. These comprise substantially a plate 58 secured to flange 28, on the extended, offset edges 59 of which a strip 60 is each time rotatably mounted. The free lower end of two strips 60 is each time interconnected by a hook-shaped member 61 which functions as tray catching means proper. The free top ends of said strips are interconnected by a shaft 62 which is engaged by the end of a piston rod 63, 64 associated with a piston-cylinder assembly 65, 66. Said assemblies are rotatably mounted on supports 73, 74 disposed on plate 58.

The two ends of the press cylinders 65 and 66, as well as those of cylinders 10 and 11, respectively 29 and 30 and 31 and 32, and 52 are each time connected via flexible lines, not shown, to a pressure medium source. A known per se control system may be used for alternately controlling the various cylinders.

In order to limiting the upwardly directed stoke of the piston rods 12, 13, there are mounted on the flange 18 two uprights 67, 68 (see FIG. 5) whereon microswitches 69, 70 are adjustably mounted, adapted to coact with the rollers 23. For limiting the downward stroke of the piston rods 12, 13 use may be made of e.g. an approach switch establishing the presence of a tray. It is observed in this respect that for screening the central portion of each stacking apparatus 1, 2, there is mounted a cylindrical jacket 71, the ends of which are mounted on the flange 18, respectively the guiding sheave 14.

Figure 2:
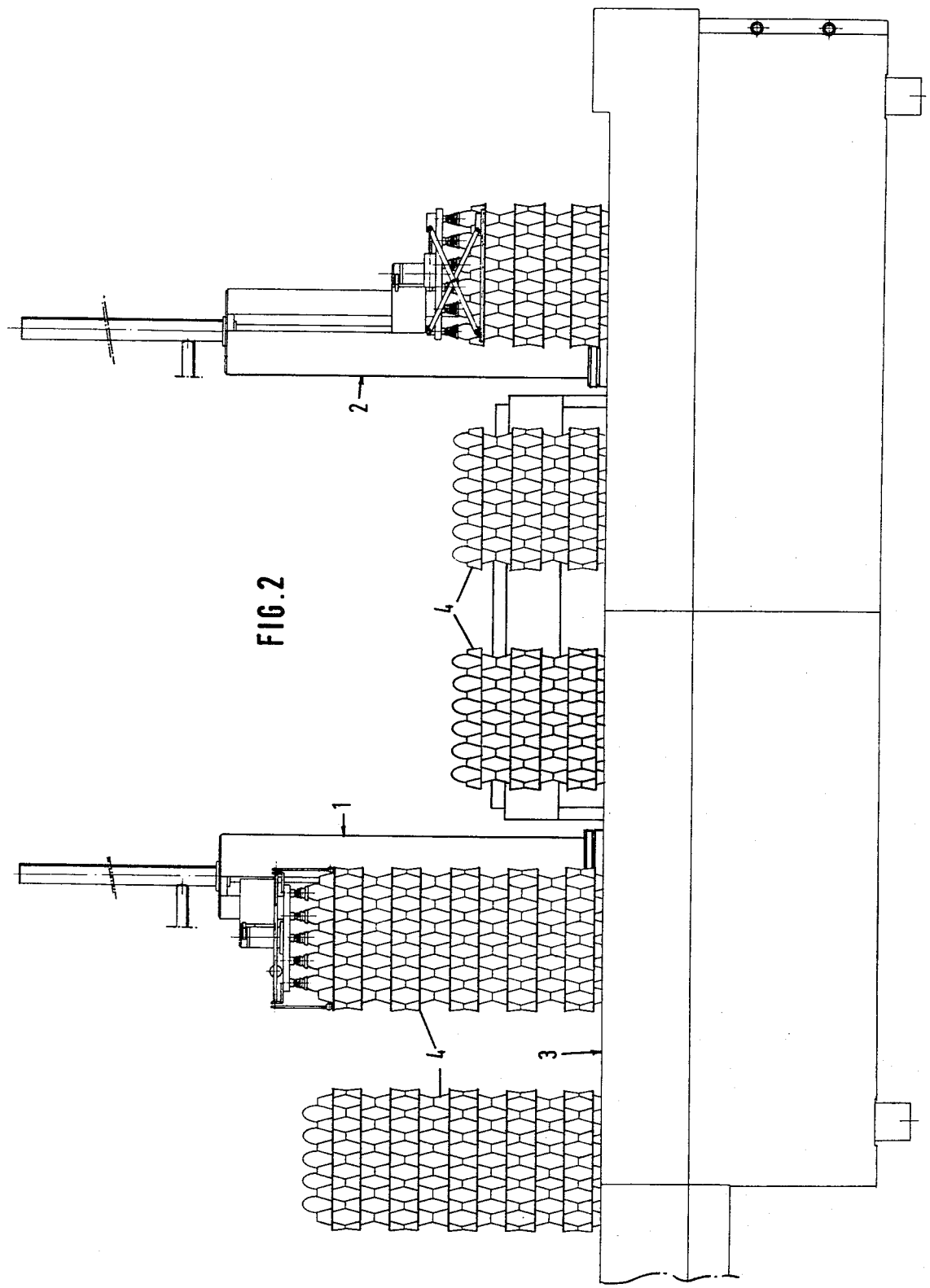
FIG. 2 is a front view of the apparatus shown in FIG. 1.

First, assume that the feed belt 3 is stationary and supports a full stack of egg-filled containers adjacent the denester 1 and a half-stack of egg-filled containers adjacent the denester 2. The suction box 41 and associated arm 21 of each denester is then lowered relative to the vertical shaft 8, by means of the respective cylinder and piston rod 10,12 (FIG. 4). Next the suction boxes are activated so as to grip the eggs in the uppermost container of each stack. Next, the suction boxes are raised by the piston and cylinder units 10,12. Next the vertical shaft 8 of the denester 1 is rotated counterclockwise as viewed in FIG. 1, thereby positioning the respective suction box over the discharge conveyor 5. Simultaneously the shaft 8 of the denester 2 is rotated clockwise to also position its respective suction box over the discharge conveyor 5. The two container-gripping devices 58 and their arm 22 now overlie the two containers which have been emptied of eggs. Next, the suction boxes and the container-gripping devices are lowered by the piston and cylinder units 10, 12, and 11, 13, respectively. Next the two suction boxes are activated to release their eggs on to the discharge conveyor and simultaneously the two container-gripping devices are activated to grip their respective empty containers. Next, after raising the suction boxes and the container-gripping devices, the shafts 8 are reverse-rotated back to their FIG. 1 positions. In these positions the container-gripping devices are positioned over the container-discharge belt and the suction boxes are positioned over the feed conveyor 3. During the back-rotation of the shafts 8 the suction boxes and the container-gripping devices are rotated about vertical axes relative to their arms 21 and 22, respectively. These rotations are effected by the cylinders 29,30 and 31,32 and are necessary because adjacent containers in the stacks are disposed at 90° to each other (as seen in FIG. 2). The operating cycle is repeated until the half-stack of containers adjacent the denester 2 has been removed from the feed conveyor 3 (and simultaneously the original full stack adjacent the denester 1 has become a half-stack). The feed conveyor 3 is then moved to the right one stack distance, as viewed in FIG. 1, and the discharging cycles continue.

It is observed that, in case of an inferior quality of trays and/or eggs, it is also possible with a view to the inspection thereof, to postition the filled trays separately on the feed belt 3 while each time shifting the belt over two tray distances.

Naturally a great many variations are possible within the scope of the invention.

I claim:

1. Apparatus for denesting a plurality of stacked containers filled with articles and traveling on a conveyor, said apparatus comprising at least two denester assemblies for removing containers and articles from the conveyor and for separately discharging the containers and the articles; each denester assembly including a first arm movable upwardly and downwardly relative to a stationary frame and pivotable for swinging movement in a horizontal plane in either direction and fitted with article-gripping means and each denester assembly including a second arm likewise movable up and down and fitted with container-gripping means, said first and second arms being arranged such that during discharge of articles from the top container of a first stack by said article-gripping means on said first arm, said second arm moves toward another stack and such that during discharge of a container from said other stack, said first arm moves toward said first stack; and one of said denester assemblies being arranged to remove containers from the upper half of a stack and the other denester assembly being arranged to remove containers from the lower half of the same stack.

2. Apparatus for denesting a plurality of stacks of containers each filled with articles, the stacks being supplied to the apparatus via a conveyor, said apparatus comprising a plurality of denesting assemblies disposed along the conveyor, each denesting assembly including means for removing articles from a container and means for removing the container after the articles have been removed therefrom, each of said assemblies operating on a corresponding portion of each stack.

3. Apparatus for denesting a plurality of stacks of containers each filled with articles comprising: a conveyor for intermittently moving the stacks of containers along a path; a plurality of denesting assemblies spaced apart along the path such that each assembly can operate on a respective stack when the stacks are not moving to remove articles from at least one container of the respective stack and to remove the thus-emptied container and to separately discharge the removed articles and the removed container; and control means for sequencing the conveyor and the denesting assemblies such that each assembly operates on a corresponding portion of each stack.

* * * * *